Patented Aug. 9, 1949

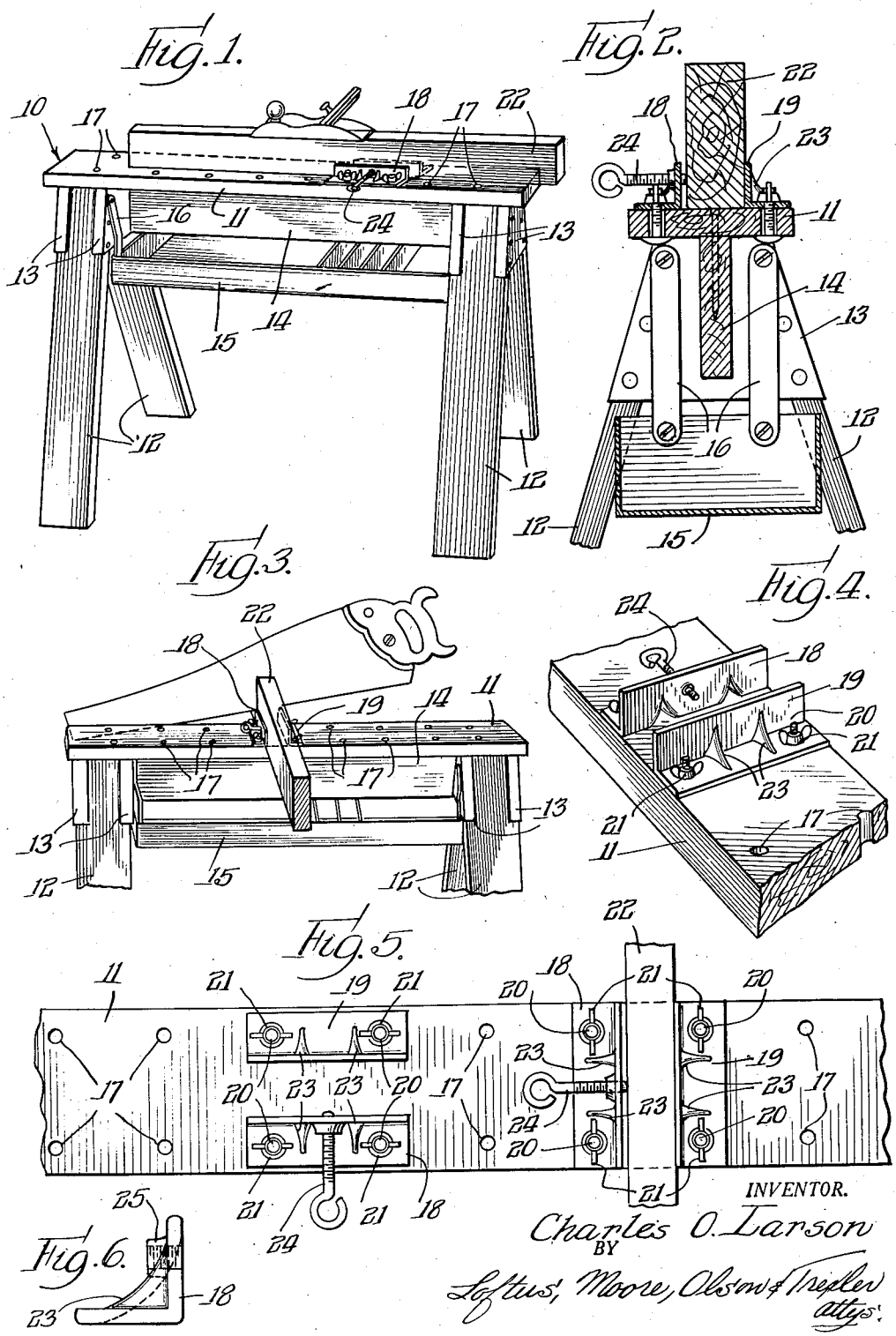

2,478,828

UNITED STATES PATENT OFFICE 2,478,828

TWO-WAY ADJUSTABLE CLAMPING FLANGE FOR WORKBENCHES OR THE LIKE

Charles O. Larson, Sterling, Ill.

Application February 14, 1945, Serial No. 577,747

1 Claim. (Cl. 144—307)

This invention relates to wood clamping devices of a type adapted for use on a work bench or a saw horse or the like for holding a piece of wood for a sawing or planing operation or for other work thereon. It is the object of the invention to provide an improved combination of parts for holding one or more work pieces rigidly in position on the top board of a bench, a saw horse, or other table arrangement.

For accomplishing the several objects of the invention, the top board of a saw horse or a bench is provided with a plurality of openings therethrough laid out along parallel rows, with the openings in one row positioned transversely opposite to the openings in the other row, and with the distance between successive openings in each of the rows corresponding to the distance between oppositely positioned openings of the two rows. The clamping device in the preferred arrangement comprises two angle irons held in operative position opposite to each other by bolts and wing nuts, the angle irons being arranged either longitudinally of the top board or transversely thereof, depending on the type of work to be accomplished. One of the angle irons is provided with a set screw in horizontal position therein for pressing a work piece firmly against the opposite angle iron. Each of the angle irons is provided preferably with one or more obliquely disposed ribs pressed therein for strengthening the construction.

It is one of the objects of the invention to improve devices of this type in sundry details hereinafter pointed out. The preferred means by which the several objects have been attained are illustrated in the accompanying drawing, in which Fig. 1 is a perspective view of a saw horse and associated parts embodying the invention.

Fig. 2 is a vertical sectional view through the upper portion of the structure of Fig. 1 but shown on an enlarged scale.

Fig. 3 is a perspective view similar to Fig. 1 but showing a changed position of certain of the parts.

Fig. 4 is a perspective view showing on an enlarged scale the clamping means of the invention.

Fig. 5 is a top plan view of a portion of a saw horse or other supporting device provided with two sets of the improved clamping devices; and Fig. 6 is an end view of one of the angle irons shown on an enlarged scale.

Referring now to the several figures of the drawing, in which corresponding parts are indicated by the same reference characters, 10 indicates a saw horse comprising a top board 11 supported by legs 12 connected thereto and braced by cross bars 13. Underneath the top board 11, a supporting board 14 is provided, as is best shown in Fig. 2. A tray 15 of any suitable type is removably supported in position by means of short supporting bars 16, as is clearly shown in said Figure 2.

As is shown in Figs. 3 and 5, the top board 11 of the saw horse or other structure is provided with a plurality of openings 17 therethrough, such openings being arranged in two rows at opposite edge portions of the board. The two rows are arranged at the same distance from each other from center to center of the openings as the distance between successive openings in each of the rows, and each of the openings in one row is directly opposite to an opening in the other row transversely of the board 11. Very satisfactory results have been had by making the openings at a distance of 5 inches from each other, but the invention of course is not limited to any such particular distance.

For holding one or more work pieces in position for a planing operation as shown in Fig. 1 or for a sawing operation as shown in Fig. 3, for example, two bars are provided arranged so as to be removably secured in position by bolts passing through the openings in the top board 11. In the arrangement shown, these bars 18 and 19 are in the form of angle irons having suitable openings in their base flanges for bolts 20 passing through openings 17 of the top board and tightened in position by means of wing nuts 21. The arrangement of course is such that the bars 18 and 19 can be positioned longitudinally of the top board 11 as shown at the left in Fig. 5 or transversely of the top board as shown at the right in said figure. It will be understood that the bars may be located at any desired point along the top board by a proper selection of the openings 17 to be used. The arrangement is such that the bolts and their nuts hold the bars in parallel spaced relation to each other so as to provide for the insertion of a work piece 22 of any suitable type between the bars.

For reinforcing and strengthening the angle bars, they have been provided with obliquely disposed strengthening ribs 23 pressed into the bars across the angles. By the use of obliquely disposed ribs 23, the bars are reinforced so as to have very substantial strength even when formed of comparatively thin metal. I have found that bars made of sheet metal of a thickness of $\frac{1}{8}$ inch or $\frac{3}{16}$ inch are very satisfactory for their purpose, particularly when they are reinforced by the ribs 23.

Means has been provided upon one of the angle bars for pressing a work piece firmly against the other bar. In the arrangement shown, this pressure means is in the form of a set screw 24 secured by means of screw threads in a suitable opening through one of the angle bars 18 or 19. In the arrangement shown, the bar 18 is shown with a screw threaded opening 25 through its vertical flange. The opening through the flange is preferably punched through without the removal of the metal so as to provide a fairly extensive length of screw threads therethrough. The arrangement is such that the set screw 24 can be adjusted as desired by rotation within the threaded opening 25 so as to press one or more work pieces 22 forcibly against the face of the bar 19, as shown in Figs. 2 and 5.

By the use of the improved arrangement as shown, a piece of wood can be very readily secured in position for a planing operation as shown in Fig. 1, with the bars 18 and 19 arranged longitudinally of the top board. Alternatively, the bars 18 and 19 can be arranged in transverse position as shown in Fig. 3 for holding a work piece 22 in position for a convenient sawing operation.

By the use of the improved construction, a clamping device of wide utility can be very readily and cheaply produced so as to be available at low cost for use by workers who otherwise would probably lack such facilities. The arrangement is such that very effective results are obtainable in the use of the improved construction.

While the form and arrangement of parts as shown in the drawing are preferred, the invention is not to be limited thereto except so far as the claim may be so limited, it being understood that changes might well be made in the form and arrangement of the parts without departing from the invention.

What is claimed is:

Clamping means of the type described, comprising in combination a top board having a plurality of openings therethrough arranged opposite to each other in two rows with the distance between the rows corresponding to the distance between successive openings in the row, two bars removably secured in parallel spaced relation to each other by bolts through selected pairs of said openings in the top board and through correspondingly spaced openings in the bars, and adjustable means adjustably mounted in one of said bars between the spaced openings of said bar for pressing a work piece against the other bar.

CHARLES O. LARSON.

REFERENCES CITED

The following references are of record in the file of this patent:

UNITED STATES PATENTS

| Number | Name | Date |
|---|---|---|
| 716,805 | Benedict | Dec. 23, 1902 |
| 1,479,209 | Topp | Jan. 1, 1924 |
| 1,954,708 | Mass | Apr. 10, 1934 |